United States Patent [19]

Juillerat

[11] Patent Number: 4,649,779
[45] Date of Patent: Mar. 17, 1987

[54] GUIDE-BAR DEVICE FOR MULTI-SPINDLE LATHE

[75] Inventor: Pierre Juillerat, Moutier, Switzerland

[73] Assignee: Sameca SA, Lamboing, Switzerland

[21] Appl. No.: 792,589

[22] Filed: Oct. 29, 1985

[30] Foreign Application Priority Data

Nov. 1, 1984 [EP] European Pat. Off. ........ 84810528.4

[51] Int. Cl.⁴ ............................................. B23B 13/04
[52] U.S. Cl. ........................................... 82/2.7; 414/17
[58] Field of Search ................................ 82/2.5, 2.7, 3; 414/14–18

[56] References Cited

U.S. PATENT DOCUMENTS

| | | | |
|---|---|---|---|
| Re. 29,905 | 2/1979 | Scheurer | 82/2.7 |
| 2,300,457 | 11/1942 | Mariotte | |
| 4,034,632 | 7/1977 | Lohner | |
| 4,406,190 | 9/1983 | Mason | 82/2.7 |
| 4,421,446 | 12/1983 | Leon et al. | |
| 4,423,993 | 1/1984 | Eaton | 414/17 |
| 4,577,536 | 3/1986 | Lechot et al. | 82/2.7 |

FOREIGN PATENT DOCUMENTS

| | | | |
|---|---|---|---|
| 0071518 | 9/1983 | European Pat. Off. | |
| 121638 | 10/1984 | European Pat. Off. | 82/2.7 |
| 2319446 | 2/1977 | France | |
| 641072 | 2/1984 | Switzerland | 82/2.7 |
| 641073 | 2/1984 | Switzerland | 82/2.7 |

Primary Examiner—Lowell A. Larson
Assistant Examiner—Jerry Kearns
Attorney, Agent, or Firm—Wender Murase & White

[57] ABSTRACT

The device comprises a distributor with switching valves and individual circuits of hydraulic fluid under pressure and of vacuum, the switching valves permitting to connect the guiding tubes either to the circuit of fluid under pressure or to the circuit of vacuum. The guiding tube which encloses a remnant of a bar stock in which a last piece is machined is set under vacuum for retracting the feeding piston of this guiding tube toward the rear part of the device in an extension tube during the indexing of the barrel at the time of machining the last piece. This permits to supress the unproductive time normally necessary for retracting the feeding piston of the guiding tube in which a new bar stock to be machined must be introduced.

15 Claims, 10 Drawing Figures

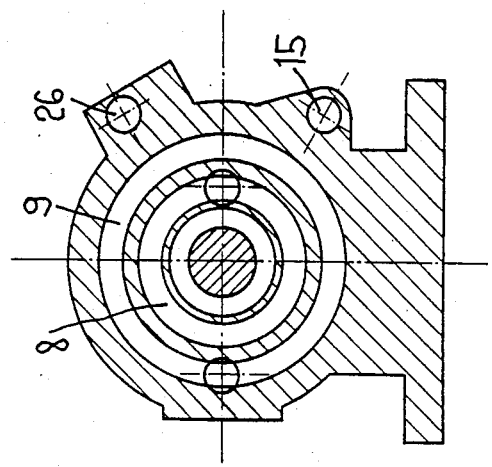
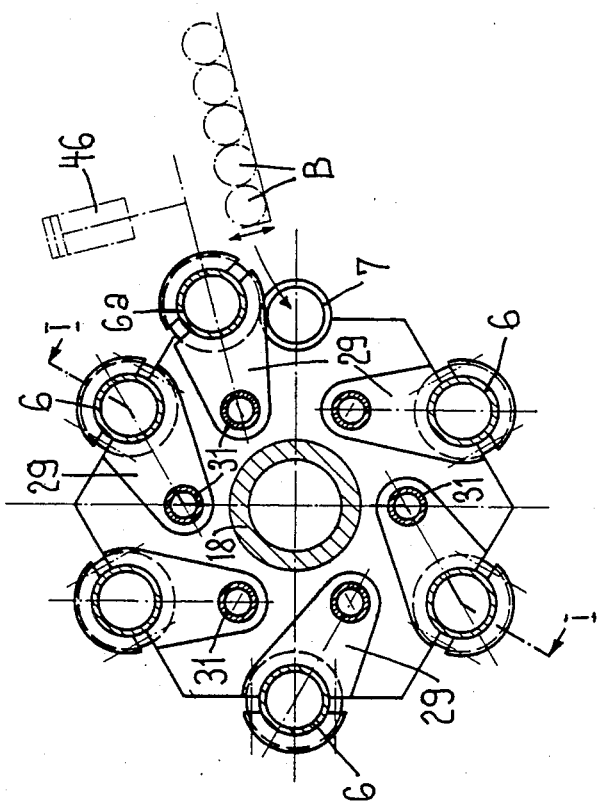

GUIDE-BAR DEVICE FOR MULTI-SPINDLE LATHE

BACKGROUND OF THE INVENTION

The present invention relates to a guide-bar device for multi-spindle lathe with a barrel operable to be indexed by said multi-spindle lathe and comprising a plurality of guiding tubes for enclosing a bar stock to be machined set into rotation within a fluid by said multi-spindle lathe, a rear part of said bar stock being supported by a feeding piston for advancing said bar stock toward a spindle of said multi-spindle lathe.

Such a guide-bar device for multi-spindle lathe with a distributor of fluid for advancing the feeding piston toward a spindle of the multi-spindle lathe is known from the published european patent application No. EP 0 108 182. At the time when a new bar stock to be machined is to be introduced in its guiding tube, the feeding piston is retracted and received entirely within a housing of the distributor. The distributor with the feeding piston is then rotated in order to present an opening in front of the empty guiding tube in which the new bar stock to be machined is to be introduced and the new bar stock is loaded in its guiding tube through this opening. However, the operation of retracting the feeding piston for permitting a new bar stock to be loaded in its guiding tube necessitates a stop of the multi-spindle lathe which increases the machining time and the new bar stock has to be introduced axially from the rear part of the distributor which is place consuming.

From the published european patent application No. EP 0 121 638 there is also known a guide-bar device for multi-spindle lathe similar to the preceding one. At the time of loading a new bar stock to be machined, the feeding piston of the empty guiding tube to be loaded is retracted within an extension tube located axially in front of the rear opening of the guiding tube and this extension tube with the feeding piston is then retracted laterally for liberating the rear opening of the empty guiding tube thus peritting the new bar stock to be presented laterally in front of this rear opening and axially engaged in the guiding tube. However, like in the preceding case, the operation of retracting the feeding piston for permitting a new bar stock to be loaded necessitates a stop of the muti-spindle lathe.

In the modern multi-spindle lathe, one seeks to reduce to a minimum the unproductive times like the stop of the lathe for permitting the feeding piston of a guiding tube in which a new bar stock to be machined is to be loaded, to be retracted, in order to accelerate the cycle of machining and to increase the rate of production. Moreover, the multi-spindle lathes are such that the different bar stocks are not exhausted simultaneously. Taking into account the tolerances in the length of the pieces which are machined from the bar stocks and that the different bars have different lengthes, it is to be seen that, in the time, the bar stocks are exhausted at random.

SUMMARY OF THE INVENTION

It is therefore an object of the present invention to realize a guide-bar device for a multi-spindle lathe which permits to considerably reduce the unproductive times resulting from the loading of a new bar stock to be machined while respecting the condition that the end of the machining of each bar may arrive at random in the time.

In order to solve this problem the guide-bar device according to the invention comprises a distributor of fluid with switch means and separated circuits of pressure fluid and of vacuum, each guiding tube being connected by the switching means either to the circuit of pressure fluid or to the vacuum circuit and the switching means being controlled for setting under vacuum a guiding tube enclosing the remnant of a bar stock, for causing the feeding piston to be retracted toward the rear part of the device during the indexing operation of the barrel at the time of machining the last piece from said remnant of said bar stock.

Due to the fact that the device according to the invention comprises a distributor with separated circuits of pressure fluid and of vacuum and switching valves which permit to connect, in any angular position of the barrel, each one of the guiding tubes to the distributor, either with the circuit of pressure fluid or with the circuit of vacuum, it possible to set under pressure or under vacuum any guiding tube, in any order of succession of these guiding tubes. More particularly, the detection of the end of a bar stock in a determined guiding tube causes this tube to be set under vacuum for retracting its feeding piston toward the rear part of the device.

The arrangement of the distributor and of the valves according to the invention permits to cause the feeding piston to be retracted during the machining (one revolution of the barrel) of the last piece in the remnant of the bar stock of the guiding tube set under vacuum. This eliminates the unproductive time normally necessary for retracting the feeding piston of the guiding tube to be loaded. As an example, in the modern multi-spindle lathes, the bar stocks may be entirely machined in no more than 8 minutes. Assuming that the unproductive time which corresponds to the retraction of the feeding piston enclosed in a tube to be loaded is 20 to 30 seconds, it is to be seen that the elimination of the unproductive time represents a gain of 25 to 30% of the machining time of a piece manufactured from 6 bars stocks each enclosed in its corresponding guiding tube of the barrel.

The invention will be described further by way of example and with reference to the accompanying drawings.

BRIEF DESCRIPTION OF THE DRAWINGS

FIG. 5 is a cross section of the device along the line V—V of FIG. 1, FIG. 9 is a cross section of the distributor along the line IX—IX of FIG. 1, and FIG. 10 shows a cross section of the valve 32.

DESCRIPTION OF THE PREFERRED EMBODIMENT

Figure 1:
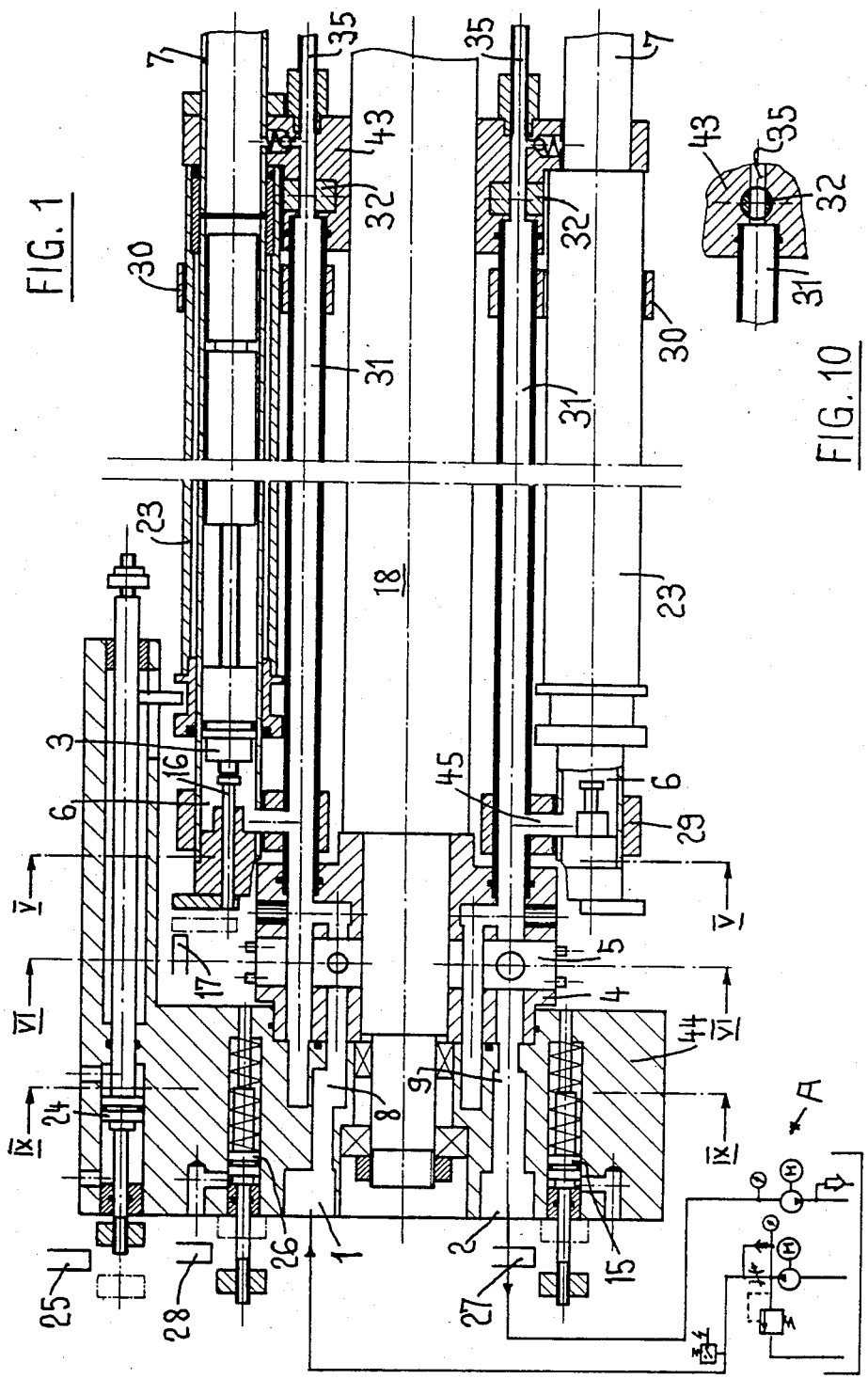
FIG. 1 is a cross section of the device according to the invention along the line I—I of FIG. 5.
Figure 2:
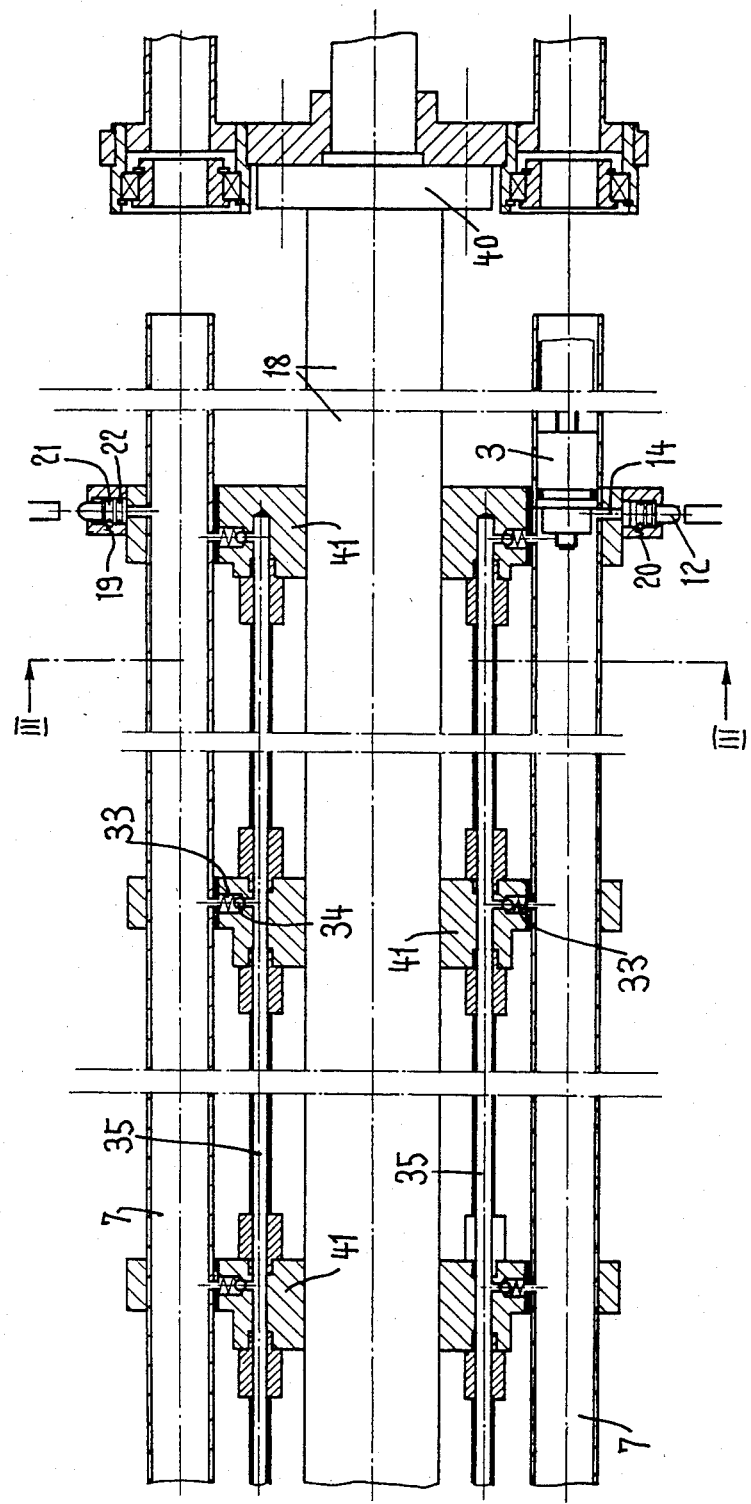
FIG. 2 is a cross section of the device along the line II—II of FIG. 3.

FIG. 1 and FIG. 2 which shows the right hand side of the device of FIG. 1 show (see also FIG. 3) that the device comprises a barrel with a front flange 40 which is to be assembled to the rear part of a multi-spindle lathe as well as intermediate disks 41 and a rear disk 43. The barrel comprises guiding tubes 7 for enclosing a bar stock to be machined and extension tubes 6 associated to each of the guiding tubes for receiving feeding pistons 3 at the time of loading of a new bar stock within an empty guiding tube. The feeding pistons 3 are provided for supporting the rear part of the bar stock and advancing the bar stock in the guiding tube 7 toward a spindle of the multi-spindle lathe.

As shown in FIG. 5, the extension tubes are mounted on connecting rods 29, 30 capable to be pivoted about tubular shafts 31 provided between the distributor 4 and a disk 43 of the barrel. FIG. 5 shows the position 6a of the extension tube 6 which is normally positioned on the horizontal axis at the right side of the device as seen from behind, at the time of loading of a new bar stock B in the corresponding guiding tube. It is to be seen that the extension tube 6a has been laterally shifted parallelly to its axis from its normal, operating position, by pivoting of the connecting rod 29, 30 about the tubular shaft 31. This lateral shifting liberates the inlet of the guiding tube 7 in front of which, as shown in FIG. 5, the new bar stock B is laterally presented. In order to permit the lateral shifting of the extension tube 6, it is necessary to uncouple the extension tube from the corresponding guiding tube 7. This is done, as shown in FIG. 1, by an axial shifting of a sliding tube 23 toward the rear part of the device by means of a control mechanism 24 (hydraulic or pneumatic jack or similar). This mechanism returns the sliding tube 23 in its normal, operating position, by shifting the sliding tube toward the front part of the device (toward the right hand side in FIG. 1) when the new bar stock is fully engaged in its guiding tube and when the extension tube 6 has been pivoted backward in its normal, operating position. FIG. 1 shows that the control mechanism 24 is assembled to a stationary part of the device according to the invention while the sliding rings 23 which connect the guiding tubes 7 to the extension tubes 6 are mounted in the rotative barrel.

Figure 6:
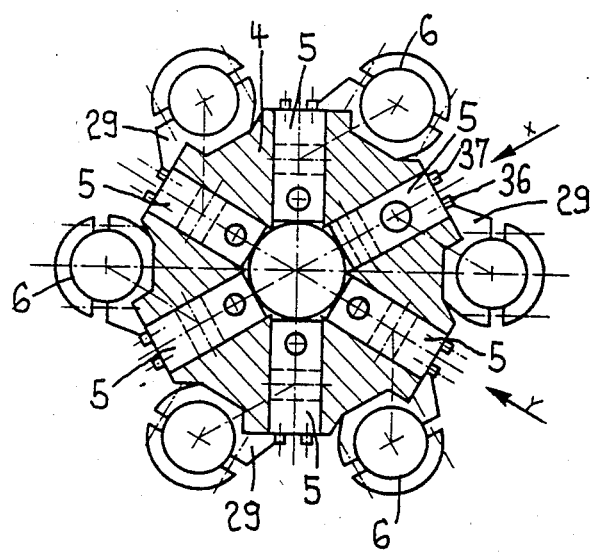
FIG. 6 is a cross section of the device along the line VI—VI of FIG. 1, FIGS. 7 and 8 show schematically the control of the switching valves.
Figure 7:
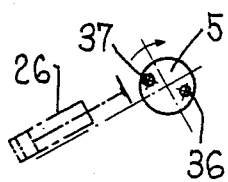
Figure 8:
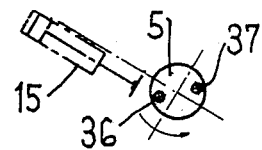

The control of the feeding piston for advancing the bar stock to be machined, the feeding of hydraulic fluid for providing a hydrodynamic bearing between the bar stock and the internal wall of its guiding tube and the vacuum for retracting the feeding piston of a guiding tube enclosing the remnant of a bar stock in which the last piece is machined, are provided by a system of distribution comprising the tubular shafts 31 and the pipes 35 connected to these shafts as well as the connecting rods 29. As shown in FIG. 1, the connecting rod 29 is connected by an opening 45 to the tube 31 for permitting the passage of a hydraulic fluid between this tube 31 and the rear part of the extension tube 6. The hydraulic fluid exerts a pressure on the rear part of the feeding piston 3 which causes, at each completion of one revolution of the barrel, the advance of the bar stock to be machined toward the multi-spindle lathe. Further, the system of distribution serves also to aspirate the hydraulic fluid when connected to the vacuum. The hydraulic fluid under pressure for providing a hydrodynamic bearing is injected radially between the bar stock and the internal wall of the guiding tube 7 by the openings 33 provided in the intermediate disks 41 and the rear disk 43 and connected to the pipes 35. These openings 33 are provided with return valves 34 (FIG. 2) the function of which being to isolate the pipes 31, 35 at the time when one of the tubes 6, 7 is set under vacuum. The rear part of the pipes 31 is mounted in a distributor 4 rotating and indexed with the barrel. As shown in FIG. 6, the distributor comprises a reversing rotative or sliding valve 5 for each guiding tube. Each valve is connected by its outlet with the corresponding tubular shaft 31 and by its inlets respectively to a first annular groove 8 and to a second annular groove 9 (FIG. 9) located in the rear, stationary part of the device. The annular grooves 8 and 9 extend upon 360° and they are connected respectively to a source of oil under pressure 1 and to a vacuum pump 2. The annular grooves of FIG. 9 represent are only a possible embodiment and it is clear that passages like bores or elongated openings may also be utilized. The valve 5 the axis of which lies under an angle of $-30°$ with the horizontal axis in FIG. 6 is controlled by a control device 26 represented in FIGS. 1 and 7, this device being similar to the device 15. The above described arrangement of the distributor 4 and of the valves 5 permits to set under pressure or vacuum any guiding tube in any order of succession. As shown in FIG. 1, the control devices 15 and 26 are mounted in a stationary part of the device according to the invention while the reversing sliding valves 5 are located in the rotative distributor 4.

Figure 3:
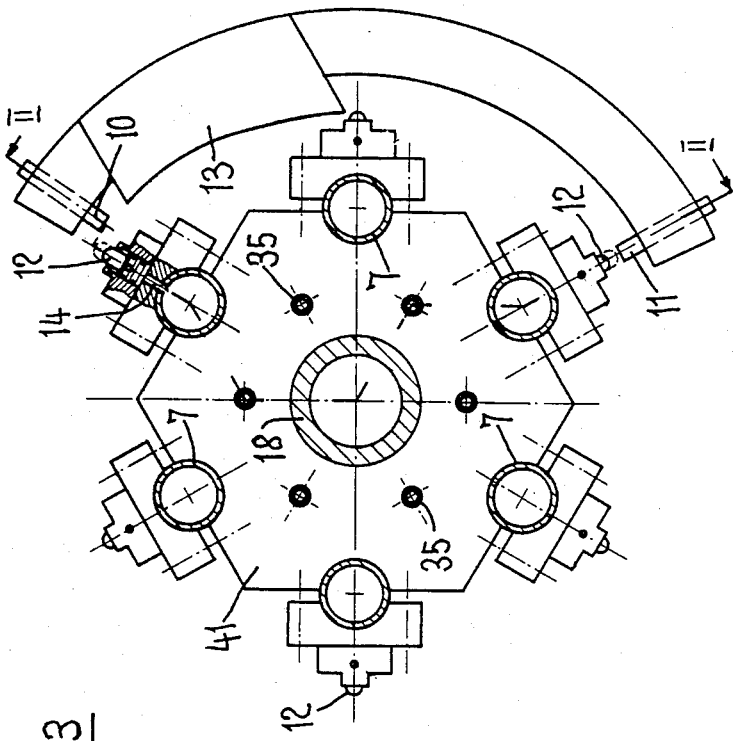
FIG. 3 is a cross section of the device along the line III—III of FIG. 2.
Figure 4:
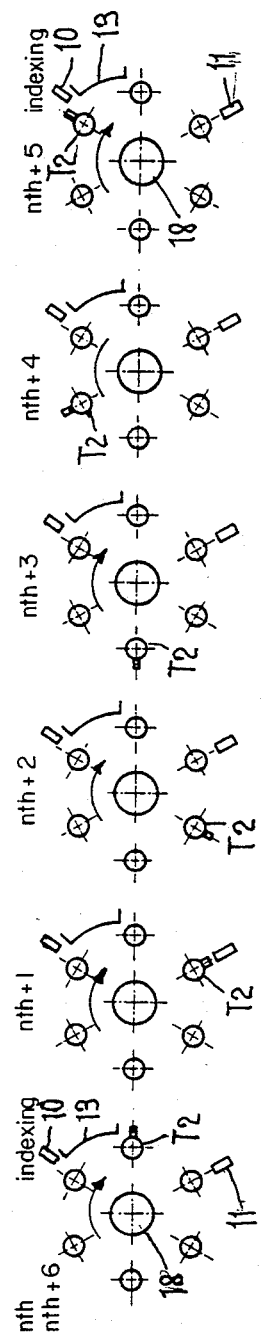
FIG. 4 shows the indexing operations during a loading cycle.

As shown in FIGS. 3 and 4, the devices 15 and 26 are controlled by detectors 10 and 11 which are e.g. microswitches, proximity detectors or similar. To each guiding tube 7 (FIGS. 2 and 3) is associated a finger 12 having two positions, the finger cooperating with the detectors 10 and 11. When the opening 14 is liberated by the rear part of the feeding piston 3 of the tube 7 enclosing the remnant of the bar stock in which the last piece is machined, the hydraulic pressure in this tube 7 causes the finger 12 to be displaced toward the outside in the external position shown in the lower part of FIG. 2 and by dotted lines in FIG. 3. A cam 13 (FIG. 3) returns the finger in its internal position during the indexing of the barrel. Both positions of the finger 12 are determined by the ball 19, the spring 20 and the grooves 21 and 22. The detectors 10 and 11 permit to seize the informations "end of bar" and "preparation of lathe stop" which are delivered when the finger 12 of the tube enclosing the remnant of the bar stock is in its external position and when this same finger passes respectively in front of the detector 11 and the detector 10. The preceding shows that the information "end of bar" is memorized during the indexing of the barrel by the external position of the finger 12. The operation will be described later in accordance with the description of a loading cycle. A valve 32 (FIG. 10) permits to adjust the rate of flow of the fluid under pressure provided in the tube 7 by the openings 33 for providing the hydrodynamic bearing.

FIG. 1 shows in A the schema of the sources of fluid under pressure and of vacuum, these sources being respectively connected to the inlets 1 and 2 of the system of distribution.

The essential elements of the device have been described above. Let us consider now the operation of the device during a cycle of loading of a new bar stock to be machined under the assumption that, as an example, the barrel comprises six guiding tubes and six extension tubes. Reference is made to FIGS. 1, 3 and 4. A loading cycle occurs in accordance with the following steps.

1. n-indexing operation (see FIG. 4)

At the time when the feed collet of the lathe opens, the bar stock in the tube no. 2, here designated by T2, is advanced by the feeding piston 3 for permitting the machining of the next piece. During this operation, the rear part of the feeding piston opens the opening 14 of T2. The fluid under pressure causes the finger 12 to move toward the outside. This position of the finger 12 memorizes the condition "end of bar" of the tube T2.

2. n+1-indexing operation

The finger 12 stops in front of the detector 11 which delivers the signal "end of bar". This signal actuates the control device 15 (controlled by the detector 27) which switches the valve 5 in such a manner that the tube T2 is coupled to the vacuum pump. From this time, and during the following indexing operations n+2, n+3, n+4 and n+5, the feeding piston 3 retracts in is guiding tube toward the rear part of the barrel (see FIG. 1, upper part).

3. When the feeding piston arrives at the rear part of its extension tube 6, it pushes the axis 16 toward the rear part of the device and this axis 16 acting on the detector 17 causes this detector 17 to deliver a signal "feeding piston to the rear".

4. n+6-indexing operation

The finger 12 which is still in its external position since the n-indexing operation, passes in front of the detector 10 which delivers a signal "preparation of lathe stop". This signal controls the stop of the lathe at the end of the n+6-indexing operation. Further, the finger 12 is caused to retreat toward the inside when, during the n+6-indexing operation, it passes under the cam 13 and it thus again ready for the function of information for which it is provided.

5. The coincidence of the signals "lathe stop", this signal being delivered by the lathe itself at the end of the n+6-indexing, and "feeding piston to the rear" controls the uncoupling of the guiding tubes 7 and of the extension tubes 6 by the sliding tube 23 which is actuated by the control device 24. The displacement of this device is controlled by the detector 25.

6. The signal delivered by the detector 25 when the tubes 6 and 7 are uncoupled, switches on the sequence of loading of a new bar stock. This sequence consists in the lateral shifting of the extension tube 6 by pivoting of the connecting rods 29, 30 about the axis of the tubular shaft 31 for liberating the rear opening of the guiding tube 7, in laterally presenting a new bar stock to be machined in front of this tube, in engaging this bar within the tube and in setting back the extension tube in its initial operating position. The means for loading the new bar stock are not described because they are not part of the present invention.

7. New coupling of the tubes 6 and 7 by the sliding tube 23 and the control device 24 as a function of a signal delivered manually or automatically when the new bar stock is fully inserted in the guiding tube and when the extension tube is in its initial operating position.

8. The signal delivered by the detector 25 when the tubes 6 and 7 are again coupled together, actuates the control device 26 which is checked by the detector 28 for causing the switching of the valve 5 such that the tube T2 is again connected to the circuit of oil under pressure. The new bar stock is then pushed toward the front part of the device by the feeding piston 3 until it comes into abutment against the remnant which is still gripped in its feed collet of the spindle no. 2 of the lathe.

9. The opening of the feed collet of the lathe causes the ejection of the remnant by the new bar stock and the automatic machining cycle can start again.

In the preceding description it has been assumed (at point 6) that the lateral shifting of the extension tube corresponding to the guiding tube enclosing the remnant is effected manually. FIG. 5 shows that the lateral shifting of the extension tube may be automatized by means of a hydraulic or pneumatic jack 46 or similar controlled e.g. by the detector 25 when the sliding tube 23 is retracted by the device 24 for uncoupling the guiding and the extension tube.

The preceding description shows that the retraction of the feeding piston toward the rear part of the guiding tube enclosing the remnant in which the last piece is machined, is effected during the indexing operations n1, n+2, n+3, n+4 and n+5. Consequently the retraction of the feeding piston does not require any unproductive time. Due to the fact that each guiding tube 7 comprises. a finger 12 for memorizing the condition "end of bar", this condition being always memorized in the position of the tube T2 of FIG. 4 and that the signal "end of bar" actuates the valve 5 for connecting this tube T2 under vacuum for retracting the feeding piston, the device according to the invention permits to set any guiding tube under pressure or under vacuum in any order of succession.

I claim:

1. A guide bar device for a multi-spindle lathe with a rotatable barrel operable to be indexed by said multi-spindle lathe, said barrel comprising at least one shaft, at least one intermediate disk disposed on said shaft, a plurality of guiding tubes removably supported about said shaft by means of said disk for enclosing a bar stock to be machined, said bar stock being set into rotation by said multi-spindle lathe in a hydraulic fluid under pressure, each of said guiding tubes including a feeding iston for supporting a rear part of said bar stock and for advancing said bar stock in said guiding tube in response to said hydraulic fluid under pressure, said guide bar device further comprising a distributor with switching means and individual circuits of hydraulic fluid under pressure and vacuum for distributing said fluid or said vacuum to said guiding tubes, and means for detecting an advanced position of a feeding piston in a guiding tube enclosing a remnant of its bar stock, said switching means being controlled by said detectng means such that said guiding tube is set under vacuum for causing said feeding piston to retract toward the rear part of said guide bar device during said indexing of said brrel at the time of machining of a last piece from said remnant.

2. A guide bar device according to claim 1, wherein the distributor is connected respectively to a source of fluid under pressure and to a source of vacuum by means of passages located in a stationary part of said device.

3. A guide bar device according to claim 2, wherein said passages are annular grooves extending upon 360°.

4. A guide bar device according to claim 1, wherein each guiding tube is associated to an extension tube provided for receiving said feeding piston at the time of loading of a new bar stock to be machined in said tube.

5. A guide bar device according to claim 4, wherein said extension tube is operable to be shifted laterally, parallelly to its axis, by rotation about an axial shaft of said guide bar device for liberating an opening of said guiding tube in which said new bar stock is to be loaded.

6. A guide bar device according to claim 4, wherein said extension tube is uncoupled from its associated guiding tube by means of a sliding tube axially shifted toward the rear part of the guide bar device by a control device when said feeding piston is retracted to said rear part of said extension tube for permitting said new bar stock to be loaded.

7. A guide bar device according to claim 4, wherein said switching means are reversive rotative or sliding valves connecting said distributor to said guiding tubes and said extension tubes by means of distributing pipes.

8. A guide bar device according to claim 1, wherein each guiding tube comprises means for memorizing a condition "end of bar" of said tube.

9. A guide bar device according to claim 8, wherein said detecting means are capable of reading a state of said memorizing means and to control said switching means in dependence on said state by means of control means.

10. A guide bar device according to claim 9, wherein said control means are mounted in a stationary part of said guide bar device, said control means controlling said switching means located in the rotative distributor.

11. A guide bar device according to claim 9, wherein said detecting means are microswitches, proximity detectors or similar and wherein said control means are hydraulic or pneumatic jacks or similar.

12. A guide bar device according to claim 9, wherein said memorizing means are a finger capable to occupy an internal and an external position, said positions being determined by stop means.

13. A guide bar device according to claim 12, wherein said condition "end of bar" arises when said bar stock which advances in its guiding tube when liberated by a feed collet of said lathe, liberates an opening in a front part of said guiding tube, said hydraulic fluid under pressure in said guiding tube causing said finger to move from its initial, internal position to its external position.

14. A guide bar device according to claim 9, further comprising means for returning said finger in its initial, internal position.

15. A guide bar device according to claim 4, further comprising control means mounted in a stationary part of said device for controlling a shifting of a sliding tube provided for coupling and uncoupling of said guiding tubes and said extension tubes.

* * * * *